US012451316B2

(12) United States Patent
Park

(10) Patent No.: US 12,451,316 B2
(45) Date of Patent: Oct. 21, 2025

(54) EXTREME-ULTRAVIOLET LIGHT SOURCE DEVICE USING ELECTRON BEAMS

(71) Applicant: WORLDBEAM SOLUTION CO., LTD., Seoul (KR)

(72) Inventor: Kyu Chang Park, Seoul (KR)

(73) Assignee: WORLDBEAM SOLUTION CO., LTD., Seoul (KR)

( * ) Notice: Subject to any disclaimer, the term of this patent is extended or adjusted under 35 U.S.C. 154(b) by 421 days.

(21) Appl. No.: 17/905,909

(22) PCT Filed: Mar. 11, 2021

(86) PCT No.: PCT/KR2021/003021
§ 371 (c)(1),
(2) Date: Sep. 8, 2022

(87) PCT Pub. No.: WO2021/182887
PCT Pub. Date: Sep. 16, 2021

(65) Prior Publication Data
US 2023/0122253 A1 Apr. 20, 2023

(30) Foreign Application Priority Data
Mar. 13, 2020 (KR) ........................ 10-2020-0031395

(51) Int. Cl.
*H01J 31/04* (2006.01)
*H01J 29/04* (2006.01)
(Continued)

(52) U.S. Cl.
CPC .............. *H01J 31/04* (2013.01); *H01J 29/04* (2013.01); *H01J 29/58* (2013.01); *H05G 2/002* (2024.08);
(Continued)

(58) Field of Classification Search
CPC .. H01J 31/04; H01J 29/04; H01J 29/58; H01J 2229/481; H01J 2229/507; H05G 2/005; H05G 2/008
See application file for complete search history.

(56) References Cited

U.S. PATENT DOCUMENTS 10,588,210 B1 3/2020 Vinokhodov et al.
2005/0178985 A1 8/2005 McGeoch
(Continued)

FOREIGN PATENT DOCUMENTS

CN 102103971 A 6/2011
CN 102124537 A 7/2011
(Continued)

OTHER PUBLICATIONS

International Search Report (with English translation) and Written Opinion issued in PCT/KR2021/003021, dated Aug. 23, 2021, 9 pages provided.
(Continued)

*Primary Examiner* — Wyatt A Stoffa
*Assistant Examiner* — Hanway Chang
(74) *Attorney, Agent, or Firm* — HSML P.C.

(57) ABSTRACT

An extreme-ultraviolet light source device comprises: a discharge chamber of which the inside is maintained in a vacuum; an electron beam-emitting unit which is located inside the discharge chamber and produces electron beams; and a metal radiator which is located inside the discharge chamber and is ionized by the electron beams. Extreme-ultraviolet radiation occurs in plasma generated from the metal radiator. The electron beam-emitting unit comprises: a cathode electrode; a plurality of emitters located on the cathode electrode and including a carbon-based material;
(Continued)

101 and a gate electrode which is located on the plurality of emitters at a distance therefrom and to which a pulse voltage is applied.

10 Claims, 4 Drawing Sheets

(51) Int. Cl.
*H01J 29/58* (2006.01)
*H05G 2/00* (2006.01)

(52) U.S. Cl.
CPC ........ *H05G 2/008* (2013.01); *H01J 2229/481* (2013.01); *H01J 2229/507* (2013.01)

(56) References Cited

U.S. PATENT DOCUMENTS

| | | | |
|---|---|---|---|
| 2007/0085044 | A1 | 4/2007 | Hergenhan et al. |
| 2015/0332887 | A1 | 11/2015 | Park et al. |

FOREIGN PATENT DOCUMENTS

| | | | |
|---|---|---|---|
| CN | 108023265 | A | 5/2018 |
| JP | 2007-012603 | A | 1/2007 |
| JP | 2007-305908 | A | 11/2007 |
| JP | 2009-032776 | A | 2/2009 |
| KR | 10-1341672 | B1 | 12/2013 |
| KR | 10-2019-0012632 | A | 2/2019 |
| WO | 2001031678 | A1 | 5/2001 |
| WO | 2019022282 | A1 | 1/2019 |
| WO | 2019244874 | A1 | 12/2019 |

OTHER PUBLICATIONS

Notice of Reasons for Refusal issued in Japanese Patent Application No. 2022-555071, mailed Jun. 6, 2023, with English translation.

Office Action issued in Chinese Application No. 202180021636.2, mailed Feb. 24, 2025, with English translation.

The extended European search report issued in European Application No. 21768271.5, mailed Mar. 20, 2024.

EXTREME-ULTRAVIOLET LIGHT SOURCE DEVICE USING ELECTRON BEAMS

TECHNICAL FIELD

The present invention relates to an extreme-ultraviolet light source device using electron beams, and more particularly, to a structure of an extreme-ultraviolet light source device advantageous for large area.

BACKGROUND ART

Extreme ultraviolet (EUV) is an electromagnetic wave in a wavelength band from approximately 10 nm to 100 nm between X-ray and deep ultraviolet (DUV) regions. Recently, much effort has been focused on the development of compact EUV light sources for applications that deal with the EUV region, such as lithography or nanoscale imaging.

For example, EUV lithography equipment is used in a nanometer-sized micro-pattern process for manufacturing semiconductor. Current EUV lithography equipment is based on high-power lasers and is entirely dependent on imports. Such EUV lithography equipment is very expensive, has a complicated internal structure, and occupies a large volume.

DISCLOSURE

Technical Problem

The present invention provides an extreme-ultraviolet light source device having a simple internal structure, a compact size, and low manufacturing cost.

Technical Solution

According to an embodiment of the present invention, an extreme-ultraviolet light source device includes: a discharge chamber of which the inside is maintained in a vacuum; an electron beam-emitting unit which is located inside the discharge chamber and produces electron beams; and a metal radiator which is located inside the discharge chamber and is ionized by the electron beams. Extreme-ultraviolet radiation occurs in plasma generated from the metal radiator. The electron beam-emitting unit includes: a cathode electrode; a plurality of emitter located on the cathode electrode and including a carbon-based material; and a gate electrode which is located on the plurality of emitters at a distance from the plurality of emitters and to which a pulse voltage is applied.

The plurality of emitters may be formed of a pointed emitter tip and include carbon nanotubes. A portion of the gate electrode facing the plurality of emitters may be formed of a metal mesh or a porous plate, and an insulating layer having a thickness greater than a height of each of the plurality of emitters may be located between the cathode electrode and a support around the plurality of emitters.

The electron beam-emitting unit may further include an anode electrode located on the gate electrode at a distance from the gate electrode and having an opening through which the electron beams pass. A voltage of 10 kV or more may be applied to the anode electrode.

The electron beam-emitting unit may further include at least one focusing electrode to which a negative voltage is applied. The focusing electrode may be located between the gate electrode and the anode electrode.

The focusing electrode may include a first focusing electrode and a second focusing electrode located closer to the anode electrode than the first focusing electrode. The first and second focusing electrodes may each have openings. The opening of the second focusing electrode may be smaller than that of the first focusing electrode, and the opening of the anode electrode may be smaller than that of the second focusing electrode.

The cathode electrode, the plurality of emitters, and the gate electrode may constitute an electron beam module. The electron beam-emitting unit may further include a rotating plate, and the plurality of electron beam modules may be arranged in a circle at a distance from each other on the rotating plate.

Any one of the plurality of electron beam modules may be aligned to face an opening of the anode electrode, and the other of the electron beam modules may be aligned to face the opening of the anode electrode when the rotating plate rotates.

The metal radiator may be made of any one of tin droplets dropping into the plasma region by an injection device and solid tin formed of a rotating body.

Advantageous Effects

The extreme-ultraviolet light source device according to the embodiments includes an electron beam-emitting unit based on a carbon-based emitter instead of a laser device, thereby simplifying an internal structure, having a compact size, and lowering manufacturing cost. The extreme-ultraviolet light source device according to the embodiments can be used as a lithographic device in a micro-pattern process for manufacturing a semiconductor.

| [Description of Reference Signs] | |
|---|---|
| 100, 101, 102: Extreme-ultraviolet light source device | |
| 10: Discharge chamber | 11: Output opening |
| 12, 13: Reflection mirror | 20: Electron discharge unit |
| 21: Cathode electrode | 22: Emitter |
| 23: Gate electrode | 24: Anode electrode |
| 26: First focusing electrode | 27: Second focusing electrode |

-continued

| [Description of Reference Signs] | |
|---|---|
| 30: Metal radiator | 40: Injection device |
| 50: Electron beam module | 51: Rotating plate |
| 52: Rotation shaft | 53: Driving unit |

MODE FOR INVENTION

Hereinafter, embodiments of the present invention will be described in detail with reference to the accompanying drawings so that those skilled in the art may easily practice the present invention. However, the present invention may be implemented in various different forms, and is not limited to exemplary embodiments described herein.

Figure 1:
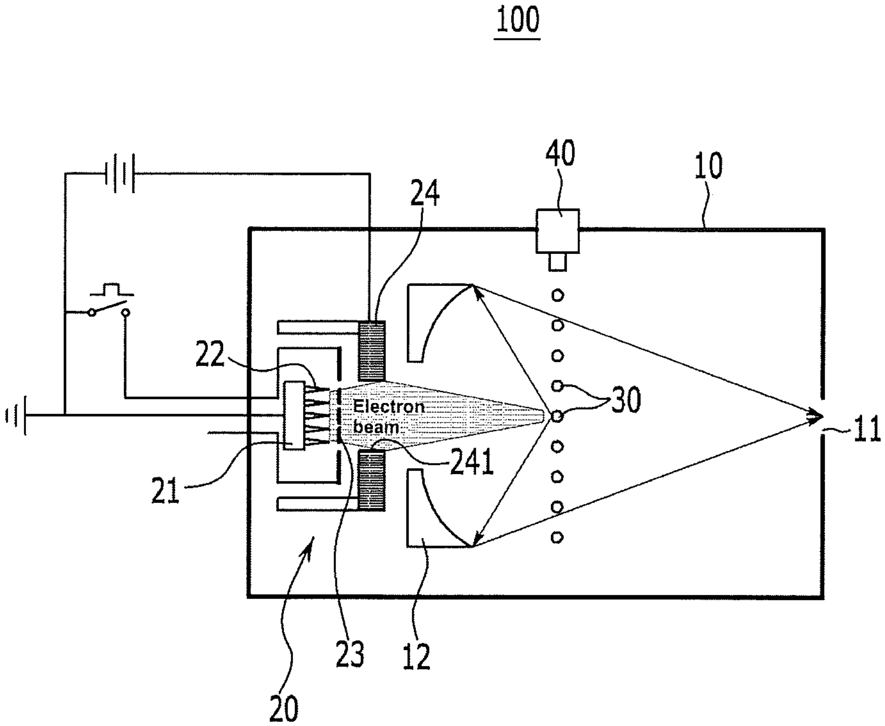
FIG. 1 is a configuration diagram of an extreme-ultraviolet light source device according to a first embodiment of the present invention.
Figure 2:
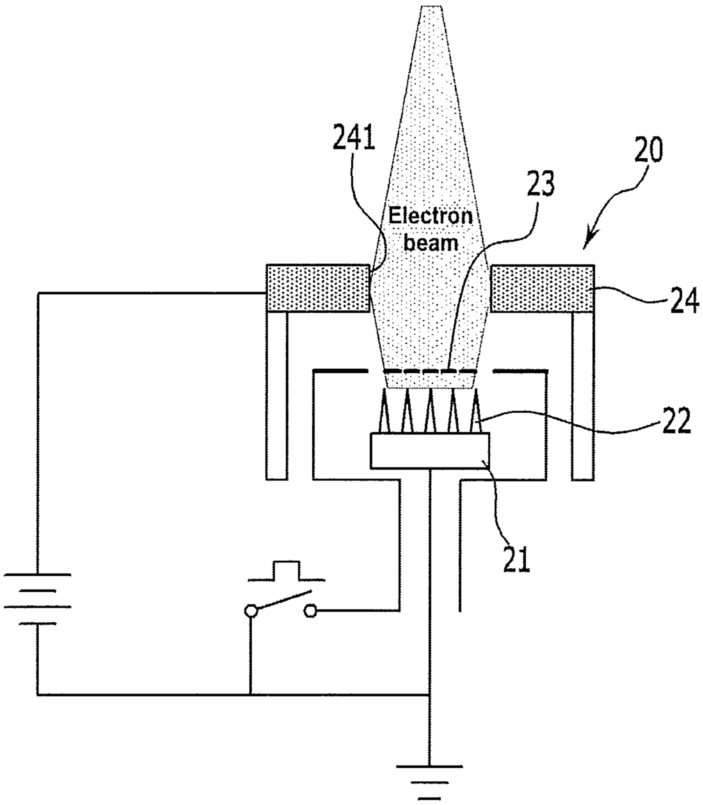
FIG. 2 is an enlarged view of an electron beam-emitting unit in the extreme-ultraviolet light source device illustrated in FIG. 1.

FIG. 1 is a block diagram of an extreme-ultraviolet light source device according to a first embodiment of the present invention, and FIG. 2 is an enlarged view of an electron beam-emitting unit in the extreme-ultraviolet light source devices illustrated in FIG. 1.

Referring to FIG. 1, an extreme-ultraviolet light source device 100 of the first embodiment includes a discharge chamber 10, an electron beam-emitting unit 20 located inside the discharge chamber 10, and a metal radiator 30. The electron beam-emitting unit 20 is not based on a laser but based on a carbon-based emitter that emits electrons by an electric field.

The discharge chamber 10 of which the inside is maintained in a vacuum, and ionizes the metal radiator 30 to generate and maintain plasma. A region in which the plasma is maintained in an internal space of the discharge chamber 10 is referred to as a plasma region for convenience.

The metal radiator 30 is heated and ionized by electron beams, and extreme-ultraviolet radiation occurs in the plasma region surrounding the metal radiator 30. That is, the plasma generated from the metal radiator 30 functions as a light source for generating extreme ultraviolet. The metal radiator 30 may include any one of lithium (Li), indium (In), tin (Sn), antimony (Sb), tellurium (Te), and aluminum (Al) or a mixture of these metals.

The metal radiator 30 may be a tin droplet, and an injection device 40 for dropping the tin droplet may be installed in the discharge chamber 10. The injection device 40 may be configured to drop tin droplets of a preset volume according to a preset time period.

The electron beam-emitting unit 20 is located inside the discharge chamber 10, and may irradiate electron beams toward the metal radiator 30 from a side of the metal radiator 30. The electron beam-emitting unit 20 includes a cathode electrode 21, a plurality of emitters 22 located on the cathode electrode 21, a gate electrode 23 located on the plurality of emitters 22 at a distance from the plurality of emitters 22, and an anode electrode 24 located on the gate electrode 23 at a distance from the gate electrode 23.

The plurality of emitters 22 may be formed of a pointed emitter tip, or may be formed of a flat emitter layer. FIGS. 1 and 2 illustrate a first case as an example. The plurality of emitters 22 may include a carbon-based material, for example, carbon nanotubes.

A portion of the gate electrode 23 facing the plurality of emitters 22 may be configured in the form of a metal mesh or a porous plate. The metal mesh is a structure in which thin metal wires are woven in a net form at a distance from each other, and the porous plate is a structure in which a plurality of openings are formed in a metal plate. The gate electrode 23 allows electron beams to pass through a space or a plurality of openings between the metal wires.

An insulating layer (or insulating spacer) (not illustrated) may be located between the cathode electrode 21 and the gate electrode 23 around the plurality of emitters 22. In this case, a thickness of the insulating layer is manufactured to be greater than a height of each of the plurality of emitters 22 so that the gate electrode 23 does not come into contact with the plurality of emitters 22. The gate electrode 23 may maintain an insulating state from the cathode electrode 21 and the plurality of emitters 22 by the insulating layer.

The anode electrode 24 is formed of a metal plate in which an opening 241 through which electron beams pass is formed. A center of the opening 241 may coincide with a center of the plurality of emitters 22 and a center of the gate electrode 23. A distance between the emitter 22 and the gate electrode 23 may be smaller than that between the gate electrode 23 and the anode electrode 24.

The cathode electrode 21 may be grounded, a pulse voltage may be applied to the gate electrode 23, and a high voltage of 10 kV or more may be applied to the anode electrode 24. Then, an electric field is formed around the plurality of emitters 22 by the voltage difference between the cathode electrode 21 and the gate electrode 23, electron beams are emitted from the plurality of emitters 22 by the electric field, and the emitted electron beams are accelerated by being attracted to the high voltage of the anode electrode 24.

In this case, the pulse voltage of the gate electrode 23 is a voltage having a high frequency or a low pulse width, and may have, for example, a high frequency characteristic of 100 kHz or more. This pulse voltage enables high-speed switching of the electron beams, leading to an effect of lowering driving power.

Among the electron beams accelerated toward the anode electrode 24, the electron beams passing through the opening 241 of the anode electrode 24 are irradiated to the metal radiator 30 to heat the metal radiator 30. The extreme-ultraviolet radiation occurs in the plasma generated from the metal radiator 30 ionized by heating, and the extreme ultraviolet are output to the outside of the discharge chamber 10 through an output opening 11 of the discharge chamber 10.

In this case, a reflection mirror 12 for condensing extreme ultraviolet toward the output opening 11 may be located between the anode electrode 24 and the metal radiator 30. The reflection mirror 12 has an opening through which electron beams pass and includes a reflective surface recessed toward the metal radiator 30. As the reflection mirror 12, molybdenum (Mo) and silicon (Si) may be alternately stacked in multiple layers.

The extreme-ultraviolet light source device 100 according to the first embodiment includes an electron beam-emitting unit 20 instead of a laser device, thereby simplifying an internal structure, having a compact size, and lowering manufacturing cost. The extreme-ultraviolet light source device 100 according to the first embodiment can be used as a lithographic device in a micro-pattern process for manufacturing a semiconductor.

Figure 3:
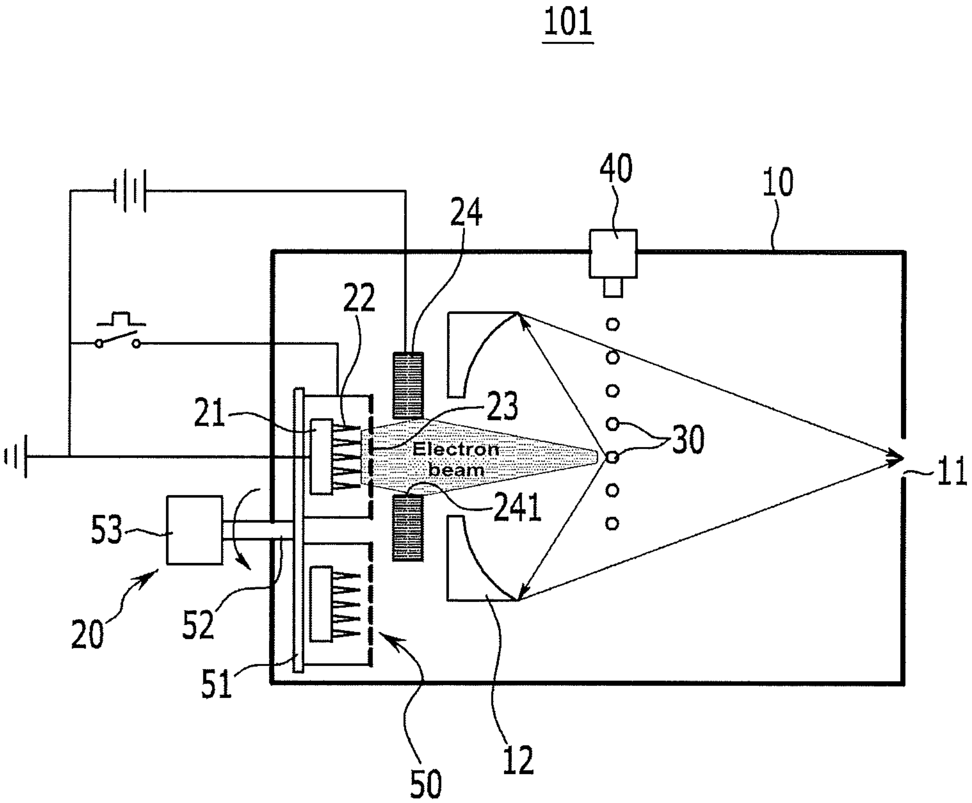
FIG. 3 is a configuration diagram of an extreme-ultraviolet light source device according to a second embodiment of the present invention.
Figure 4:
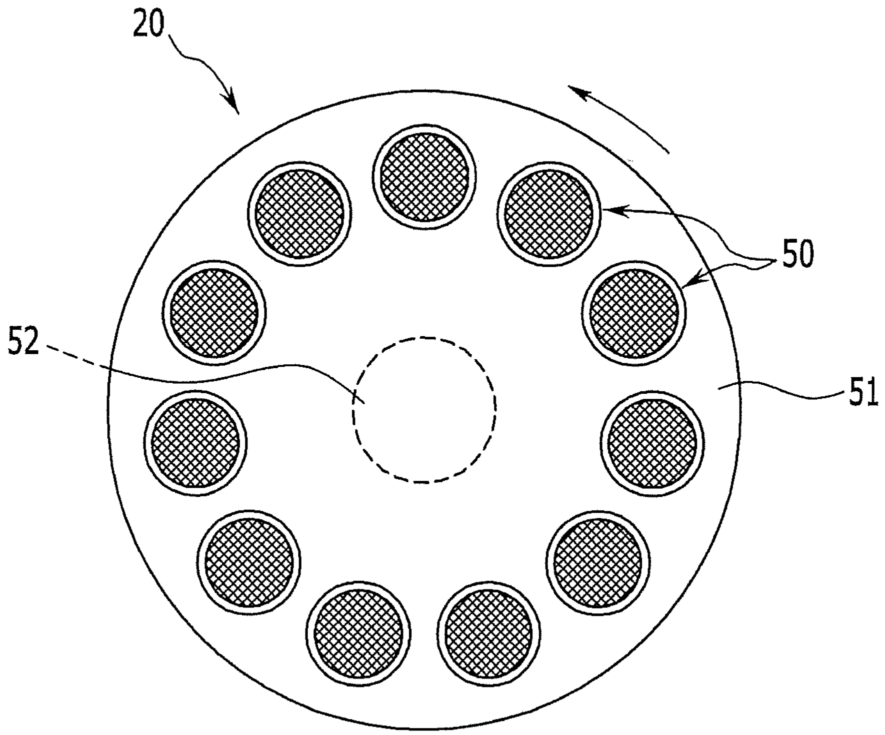
FIG. 4 is a perspective view of an electron beam-emitting unit in the extreme-ultraviolet light source device illustrated in FIG. 3.

FIG. 3 is a block diagram of an extreme-ultraviolet light source device according to a second embodiment of the present invention, and FIG. 4 is an enlarged view of an electron beam-emitting unit in the extreme-ultraviolet light source devices illustrated in FIG. 3.

Referring to FIGS. 3 and 4, in an extreme-ultraviolet light source device 101 of the second embodiment, a portion of the electron beam-emitting unit 20 is rotatably configured.

For example, the cathode electrode 21, the plurality of emitters 22, and the gate electrode 23 constitute an electron beam module 50, and the plurality of electron beam modules 50 may be arranged in a circle at a distance from each other on the rotating plate 51.

The electron beam-emitting unit 20 may include a rotating plate 51, a rotation shaft 52 fixed to the rotating plate 51, and a driving unit 53 coupled to the rotation shaft 52 to rotate the rotation shaft 52. The rotating plate 51 may be a disk, and the driving unit 53 may be formed of a step motor, but is not limited to this example. A part of the rotation shaft 52 and the driving unit 53 may be located outside the discharge chamber 10.

The rotation shaft 52 is vertically displaced from the opening 241 of the anode electrode 24, and any one 50 of the plurality of electron beam modules 50 is aligned to face the opening 241 of the anode electrode 24. When the life of the electron beam module 50 aligned to face the anode electrode 24 is over after a certain period of use, the driving unit 53 rotates the rotating plate 51 so that the other electron beam module 50 faces the anode electrode 24.

In this way, by arranging the plurality of electron beam modules 50 on the rotating plate 51 and rotating the rotating plate 51, the electron beam modules 50 may be used one by one in order. In this case, a replacement cycle of the electron beam-emitting unit 20 may be increased to simplify maintenance and increase the lifespan of the discharge chamber 10.

The extreme-ultraviolet light source device 101 of the second embodiment has the same or similar configuration as the above-described first embodiment except that the electron beam-emitting unit 20 is rotatably configured.

Figure 5:
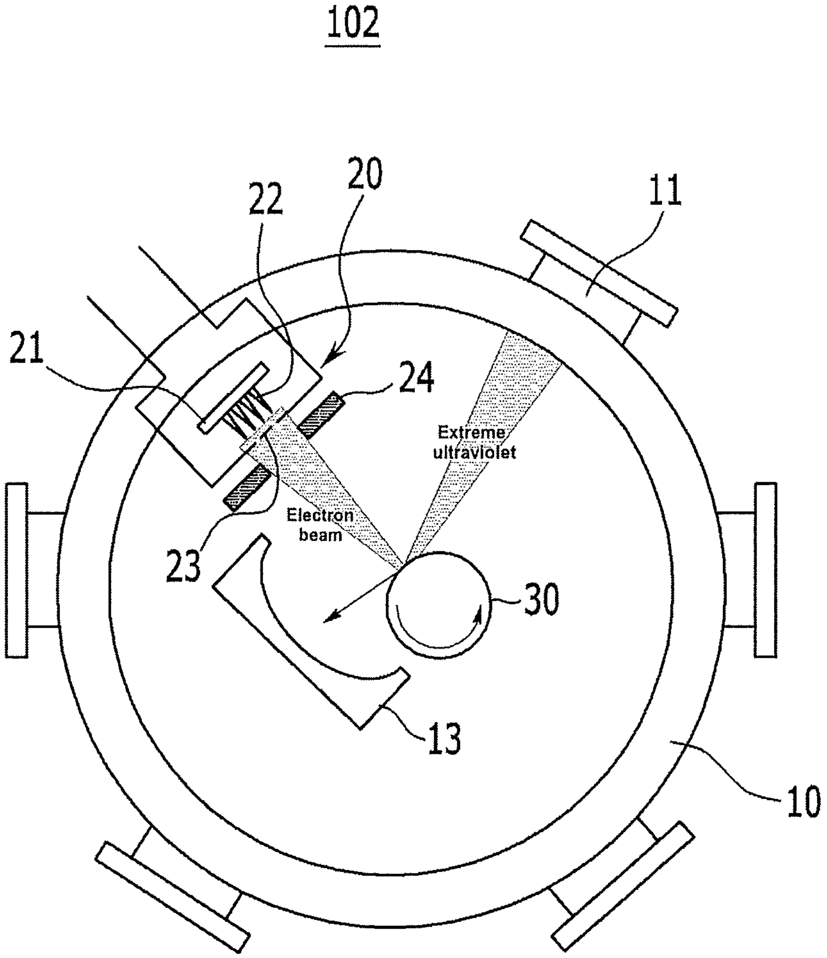
FIG. 5 is a configuration diagram of an extreme-ultraviolet light source device according to a third embodiment of the present invention.

FIG. 5 is a configuration diagram of an extreme-ultraviolet light source device according to a third embodiment of the present invention.

Referring to FIG. 5, in an extreme-ultraviolet light source device 102 of the third embodiment, the discharge chamber 10 may have a cylindrical shape. The metal radiator 30 may include solid tin, and may be formed of a rotating body. The metal radiator 30 formed of the rotating body has a long service life, resulting in increasing the replacement cycle, and making the configuration very simple compared to an injection device that drops tin droplets.

The electron beam-emitting unit 20 may ionize the metal radiator 30 by irradiating electron beams toward the metal radiator 30, and the extreme-ultraviolet radiation occurs in the plasma region surrounding the metal radiator 30. The output opening 11 may be located on one side of the metal radiator 30 around the metal radiator 30, and the reflection mirror 13 may be located on the opposite side. The reflection mirror 13 reflects extreme ultraviolet toward the output opening 11 to increase the intensity of the extreme ultraviolet passing through the output opening 11.

The extreme-ultraviolet light source device 102 of the third embodiment has the same or similar configuration to the above-described first embodiment except for the shape of the discharge chamber 10 and the configuration of the metal radiator 30.

Figure 6:
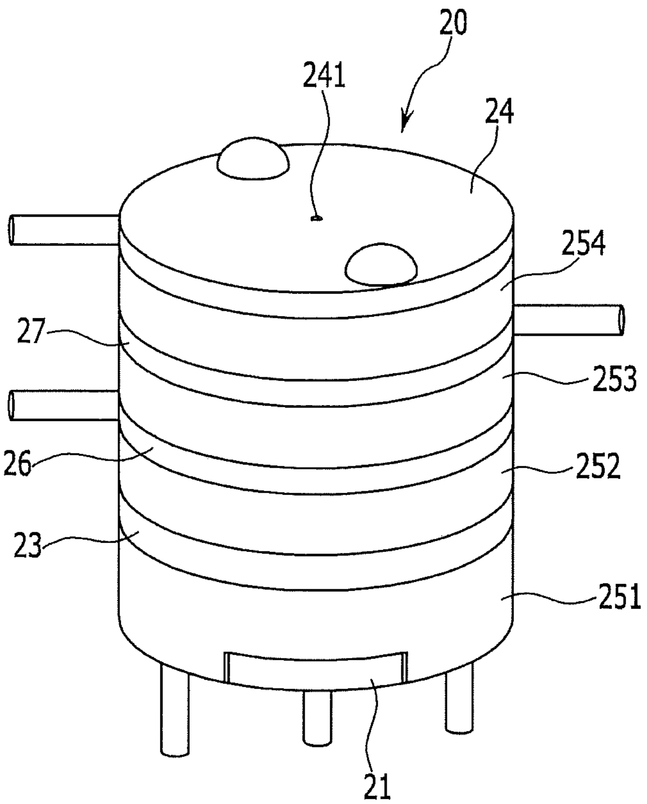
FIGS. 6 and 7 each are a perspective view and a cross-sectional view of an electron beam-emitting unit in an extreme-ultraviolet light source device according to a fourth embodiment of the present invention.
Figure 7:
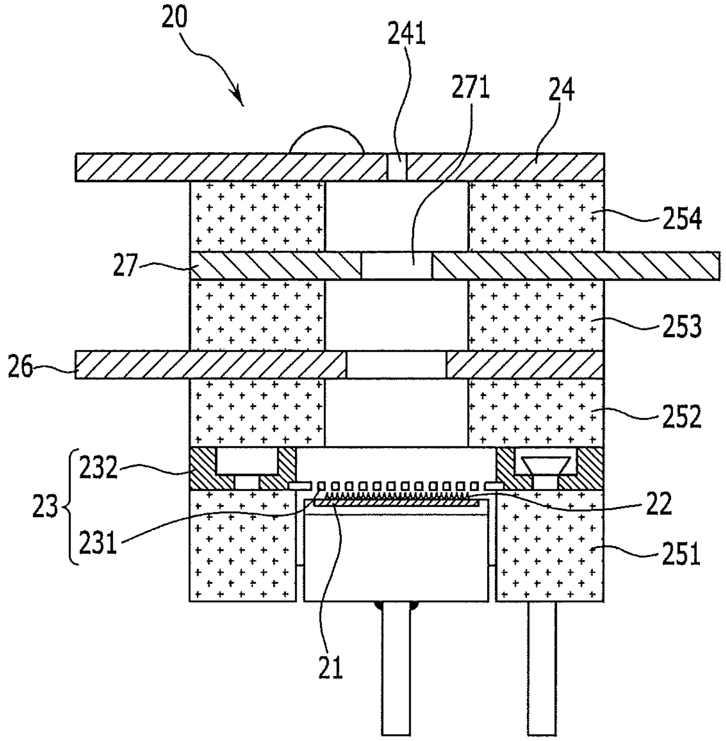

FIGS. 6 and 7 each are a perspective view and a cross-sectional view of an electron beam-emitting unit in an extreme-ultraviolet light source device according to a fourth embodiment of the present invention.

Referring to FIGS. 6 and 7, in the extreme-ultraviolet light source device of the fourth embodiment, the electron beam-emitting unit 20 further includes at least one focusing electrode located between the gate electrode 23 and the anode electrode 24. The focusing electrode may include a first focusing electrode 26 located on the gate electrode 23 and a second focusing electrode 27 located on the first focusing electrode 26.

The gate electrode 23 may include a metal mesh 231 corresponding to the plurality of emitters 22 and a support 232 fixed to an edge of the metal mesh 231 to support the metal mesh 231. In addition, a first insulating layer 251 may be located between the cathode electrode 21 and the support 232 around the plurality of emitters 22.

A second insulating layer 252 may be located between the gate electrode 23 and the first focusing electrode 26 to insulate the gate electrode 23 and the first focusing electrode 26, and a third insulating layer 253 may be located between the first focusing electrode 26 and the second focusing electrode 27 to insulate the first focusing electrode 26 and the second focusing electrode 27. In addition, a fourth insulating layer 254 may be located between the second focusing electrode 27 and the anode electrode 24 to insulate the second focusing electrode 27 and the anode electrode 24.

The second insulating layer 252, the first focusing electrode 26, the third insulating layer 253, the second focusing electrode 27, and the fourth insulating layer 254 each have openings through which electron beams pass. The openings of the second insulating layer 252, the third insulating layer 253, and the fourth insulating layer 254 may have the same size.

A diameter of an opening 261 of the first focusing electrode 26 may be smaller than the metal mesh 231 of the gate electrode 23, and a diameter of an opening 271 of the second focusing electrode 27 may be smaller than that of the opening 261 of the first focusing electrode 26. A diameter of the opening 241 of the anode electrode 24 may be smaller than that of the opening 271 of the second focusing electrode 27. That is, the first focusing electrode 26, the second focusing electrode 27, and the anode electrode 24 may have small openings in the order.

A negative (−) voltage may be applied to the first and second focusing electrodes 26 and 27. Then, the electron beams passing through the metal mesh 231 of the gate electrode 23 are focused by a repulsive force applied by the first and second focusing electrodes 26 and 27 while sequentially passing through the opening 261 of the first focusing electrode 26 and the opening 271 of the second focusing electrode 27.

The electron beam-emitting unit 20 including the first and second focusing electrodes 26 and 27 may reduce the size of the electron beam reaching the metal radiator 30 by focusing the electron beam, and as a result, it is possible to extend the service life of the metal radiator 30 by reducing the generation of metal debris.

The extreme-ultraviolet light source device of the fourth embodiment has the same or similar configuration to any one of the first and third embodiments described above except for the configuration of the electron beam-emitting unit 20.

Although preferred embodiments of the present invention have been described above, the present invention is not limited thereto, and the present invention can be variously modified within the scope of the claims, the detailed description of the invention, and the appended drawings, and it is natural that various modifications also fall within the scope of the present invention.

INDUSTRIAL APPLICABILITY

An extreme-ultraviolet light source device according to embodiments of the present invention includes an electron beam-emitting unit based on a carbon-based emitter instead of a laser device, thereby simplifying an internal structure, having a compact size, and lowering manufacturing cost. The extreme-ultraviolet light source device according to the embodiments of the present invention can be used as a lithographic device in a micro-pattern process for manufacturing a semiconductor.

The invention claimed is:

1. An extreme-ultraviolet light source device, comprising:

a discharge chamber of which the inside is maintained in a vacuum;

an electron beam-emitting unit which is located inside the discharge chamber and produces electron beams; and a metal radiator which is located inside the discharge chamber and is ionized by the electron beams, wherein extreme-ultraviolet radiation occurs in plasma generated from the metal radiator, and the electron beam-emitting unit includes a cathode electrode, a plurality of emitters located on the cathode electrode and including a carbon-based material, and a gate electrode which is located on the plurality of emitters at a distance from the plurality of emitters and to which a pulse voltage is applied.

2. The extreme-ultraviolet light source device of claim 1, wherein the plurality of emitters is formed of a pointed emitter tip and includes carbon nanotubes.

3. The extreme-ultraviolet light source device of claim 2, wherein a portion of the gate electrode facing the plurality of emitters is formed of a metal mesh or a porous plate, and an insulating layer having a thickness greater than a height of each of the plurality of emitters is located between the cathode electrode and the gate electrode around the plurality of emitters.

4. The extreme-ultraviolet light source device of claim 1, wherein the electron beam-emitting unit further includes an anode electrode located on the gate electrode at a distance from the gate electrode and having an opening through which the electron beams pass, and a voltage of 10 kV or more is applied to the anode electrode.

5. The extreme-ultraviolet light source device of claim 4, wherein the electron beam-emitting unit further includes at least one focusing electrode which is located between the gate electrode and the anode electrode and to which a negative voltage is applied.

6. The extreme-ultraviolet light source device of claim 5, wherein the focusing electrode includes a first focusing electrode and a second focusing electrode located closer to the anode electrode than the first focusing electrode.

7. The extreme-ultraviolet light source device of claim 6, wherein the first and second focusing electrodes each have openings, the opening of the second focusing electrode is smaller than that of the first focusing electrode, and the opening of the anode electrode is smaller than that of the second focusing electrode.

8. The extreme-ultraviolet light source device of claim 4, wherein the cathode electrode, the plurality of emitters, and the gate electrode constitute an electron beam module, the electron beam-emitting unit further includes a rotating plate, and a plurality of electron beam modules are arranged in a circle at a distance from each other on the rotating plate.

9. The extreme-ultraviolet light source device of claim 8, wherein any one of the plurality of electron beam modules is aligned to face an opening of the anode electrode, and the other of the electron beam modules is aligned to face the opening of the anode electrode when the rotating plate rotates.

10. The extreme-ultraviolet light source device according to claim 1, wherein the metal radiator is made of any one of tin droplets dropping into the plasma region by an injection device and solid tin formed of a rotating body.

* * * * *